United States Patent [19]

Kagan et al.

[11] Patent Number: 5,618,045
[45] Date of Patent: Apr. 8, 1997

[54] INTERACTIVE MULTIPLE PLAYER GAME SYSTEM AND METHOD OF PLAYING A GAME BETWEEN AT LEAST TWO PLAYERS

[76] Inventors: Michael Kagan, 22 Bruria St., Jerusalem 93184, Israel; Ian Solomon, 10 Shlomo Zemach, Yafe Nof, Jerusalem 96190, Israel

[21] Appl. No.: 385,485

[22] Filed: Feb. 8, 1995

[51] Int. Cl.⁶ .................................................. A63F 9/24
[52] U.S. Cl. .................................................. 463/40
[58] Field of Search ........................... 273/453, 433–438, 273/859, 416

[56] References Cited

U.S. PATENT DOCUMENTS

| | | | |
|---|---|---|---|
| 4,521,014 | 6/1985 | Sitrick | 273/439 |
| 4,924,216 | 5/1990 | Leung | 273/438 X |
| 5,048,831 | 9/1991 | Sides | 273/85 G |
| 5,098,110 | 3/1992 | Yang | 273/438 |

FOREIGN PATENT DOCUMENTS

| | | | |
|---|---|---|---|
| 4237603 | 5/1994 | Germany | 273/416 |

*Primary Examiner*—Paul E. Shapiro
*Attorney, Agent, or Firm*—Mark M. Friedman

[57] ABSTRACT

An interactive multiple player game system including at least two playing devices communicating over an ad-hoc, wireless, all-to-all broadcast network. A playing device includes a processor for running a game scenario common to all of the playing devices within the network, a player controlled interface for enabling a player action within the game scenario, a transmitter for transmitting the player action over the network, a receiver for receiving player actions from other playing devices transmitting over the network, and a display for displaying at least a portion of the game scenario. The interactive multiple player game system can further include a play station device and an interface apparatus for interfacing between the play station device and the playing devices.

10 Claims, 3 Drawing Sheets

| SYN | ID | CMD |

FIG.4A

| SYN | 1 | 1 |

FIG.4B

| SYN | 1 | 1 |    | SYN | 2 | 1 |

FIG.4C

| SYN | 1 | 1 |    | SYN | 2 | 1 |    | SYN | 3 | 1 |
| SYN | 1 | 2 |    | SYN | 2 | 2 |    | SYN | 2 | 3 |
| SYN | 1 | 2 |    | SYN | 2 | 3 |    | SYN | 3 | 3 |
| SYN | 1 | 5 |    | SYN | 2 | 3 |    | SYN | 3 | 1 |

FIG.4D

INTERACTIVE MULTIPLE PLAYER GAME SYSTEM AND METHOD OF PLAYING A GAME BETWEEN AT LEAST TWO PLAYERS

FIELD AND BACKGROUND OF THE INVENTION

The present invention relates to electronic games in general and in particular to interactive multiple player game systems which are designed to be played by two or more players.

The art of electronic game systems is well developed. Several recent notable developments include the development of multiple player game systems, enabling two players to play against each other on hand-held game devices by physically connecting the two game devices, and the like.

In particular, US Pat. No. 5,159,549 to Hallman et al, entitled "Multiple Player Game Data Processing System with Wager Accounting" describes a multiple player betting system in which a central processing unit controls a number of player stations to which it is connected by wires. The CPU receives data on an interrupt basis from each of the player stations and regulates the ordered play among competitors. The CPU is responsive to the data for indicating a winner, calculating the accumulated point total or wealth of each of the players and the like.

Also, U.S. Pat. No. 5,136,644 to Audebert et al., entitled "Portable Electronic Device For Use in Conjunction with a Screen", describes a portable device for enabling player interaction with a program on a screen, typically a television screen. The program can be a televised broadcast, provided by a computer terminal, a telecommunication terminal, or other similar terminal.

There remains a need for an interactive multiple player game system designed to be played by two or more players each playing on a playing device in wireless communication with other playing devices.

SUMMARY OF THE INVENTION

The object of the present invention is to provide an interactive multiple player game system and a method therefore in which two or more players, each playing on their own playing device in wireless communication with the other playing devices, can participate in a game scenario common to all the playing devices.

Hence, there is provided according to the teachings of the present invention, an interactive multiple player game system comprising at least two playing devices communicating over an ad-hoc, wireless, all-to-all broadcast network, a playing device including: (a) a processor for running a game scenario common to all of the at least two playing devices; (b) a player controlled interface for enabling a player action within the game scenario; (c) a transmitter connected to the player controlled interface, the transmitter transmitting the player action over the network; (d) a receiver connected to the processor, the receiver receiving player actions from the at least one other playing device transmitting over the network; and (e) a display for displaying at least a portion of the game scenario.

According to a further feature of the present invention, a playing device further includes a clock, the clock of a second playing device being synchronized with the clock of a first playing device.

According to a still further feature of the present invention, a playing device transmits the player action at a pre-determined interval within a transmission cycle of the system.

According to a yet still further feature of the present invention, the display of each of the at least two playing devices displays a different portion of the game scenario.

There is also provided according to the teachings of the present invention, an interactive multiple player game system comprising: (a) a play station device including an interface apparatus; and (b) at least one playing device communicating with the interface apparatus over an ad-hoc, wireless, all-to-all broadcast network, a playing device including: (i) a processor for running a game scenario common to the at least one playing device and the play station device; (ii) a player controlled interface for enabling a player action within the game scenario; (iii) a transmitter connected to the player controlled interface, the transmitter transmitting the player action over the network; (iv) a receiver connected to the processor, the receiver receiving instructions from at least the play station device transmitting over the network; and (v) a display for displaying at least a portion of the game scenario.

According to a further feature of the present invention, the playing device includes a clock and the play station device includes a clock, the clock of the play station device being synchronized with the clock of the playing device.

According to a still further feature of the present invention, the playing device transmits the player action at a pre-determined interval within a transmission cycle of the system.

According to a yet still further feature of the present invention, the display of the at least one playing device displays a portion of the game scenario associated with the playing device.

There is also provided according to the teachings of the present invention, a method for playing an interactive multiple player game between at least two players, comprising the steps of: (a) establishing an ad-hoc, wireless, all-to-all broadcast network between at least two playing devices; (b) providing a game scenario common to all of the at least two playing devices; (c) enabling a player action by each player within the game scenario; (d) transmitting player actions over the network; (e) receiving player actions transmitted over the network; and (f) displaying at least a portion of the game scenario.

BRIEF DESCRIPTION OF THE DRAWINGS

The invention is herein described, by way of example only, with reference to the accompanying drawings, in which similar reference numbers have been employed throughout to designate corresponding parts, wherein:

FIGS. 4a–4d show exemplary transmission packets transmitted by playing devices of the system during a playing session.

DETAILED DESCRIPTION OF THE PREFERRED EMBODIMENT

The present invention is for an interactive multiple player game system for two or more players and a method for playing an interactive multiple game between at least two players.

The principles of the system and method of the present invention may be better understood with reference to the drawings and the accompanying description.

Briefly stated, the interactive multiple player game system of the present invention involves dynamically establishing an ad-hoc wireless local area network (LAN) between a group of playing devices. Each playing device includes a player controlled interface for enabling a player action within a game scenario common to all the playing devices. Each playing device also includes a display for the displaying at least a portion of the game scenario. In other words, notwithstanding that the game scenario is common to all the playing devices, the image on the displays of different playing devices may differ.

It is a particular feature of the present invention that the ad-hoc wireless LAN establishes an "all-to-all" broadcast network such that all the playing devices have full information regarding the player actions of the other playing devices participating in the broadcast network. Therefore, in summary, the broadcast network enables an information transfer protocol satisfying the following conditions: First, that each playing device participating in the broadcast network transmits transmission packets receivable by all the other playing devices participating in the network. Second, that each playing device participating in the broadcast network receives the transmission packets issued by the other playing devices participating in the network. Third, that each playing device can identify the transmission packets of the playing devices participating in the network. And lastly, that the rate of information transfer is such that a player perceives a real-time game scenario. Typically, a minimum display refresh rate of 10 screens per second is required to ensure that a player perceives a real-time game scenario.

Figure 1:
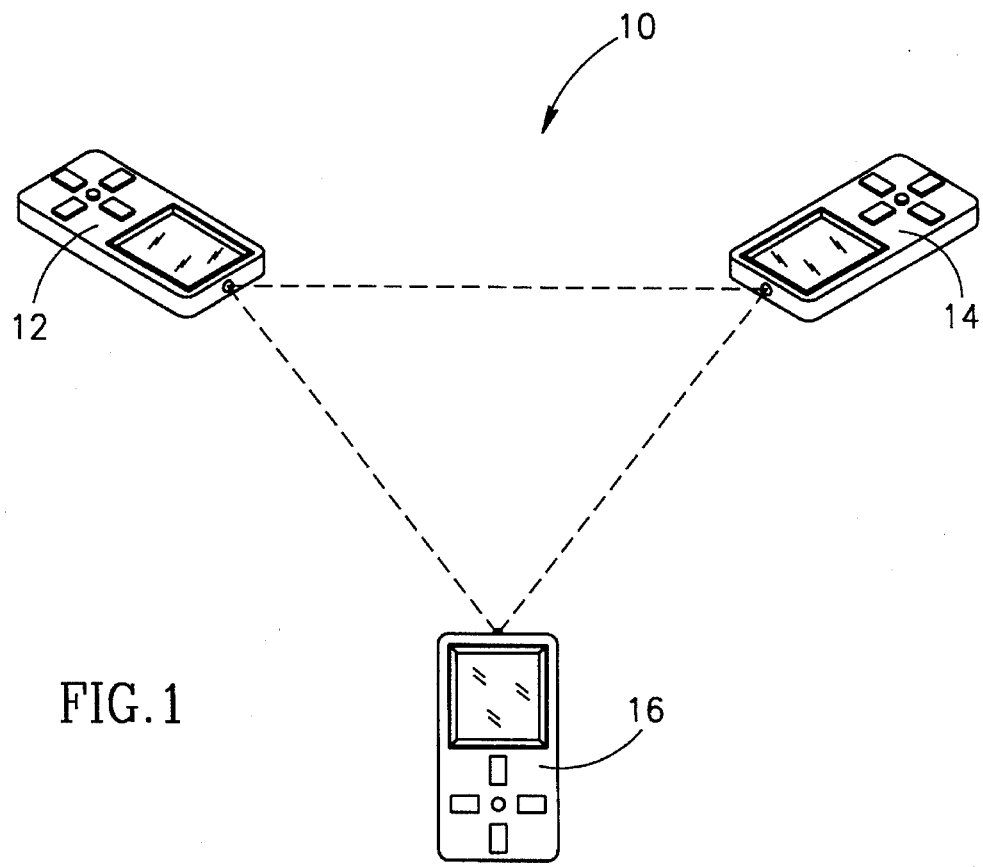
FIG. 1 shows a schematic view of an interactive multiple player game system constructed and operative according to the teachings of the present invention.

Referring now to the drawings, FIG. 1 depicts an interactive multiple player game system, generally designated 10, constructed and operative according to the teachings of the present invention. In this case, multiple player game system 10 includes three playing devices 12, 14 and 16 implemented as either hand-held, head-mounted or table-top devices. Each of playing devices 12, 14 and 16 communicates with the other playing devices over a temporary or ad-hoc wireless Local Area Network (LAN) initiated by one of playing devices 12, 14 and 16. The communication can be achieved by either short-range radio communication, infrared communication, ultra-sonic communication, and the like, as known in the art.

Figure 2:
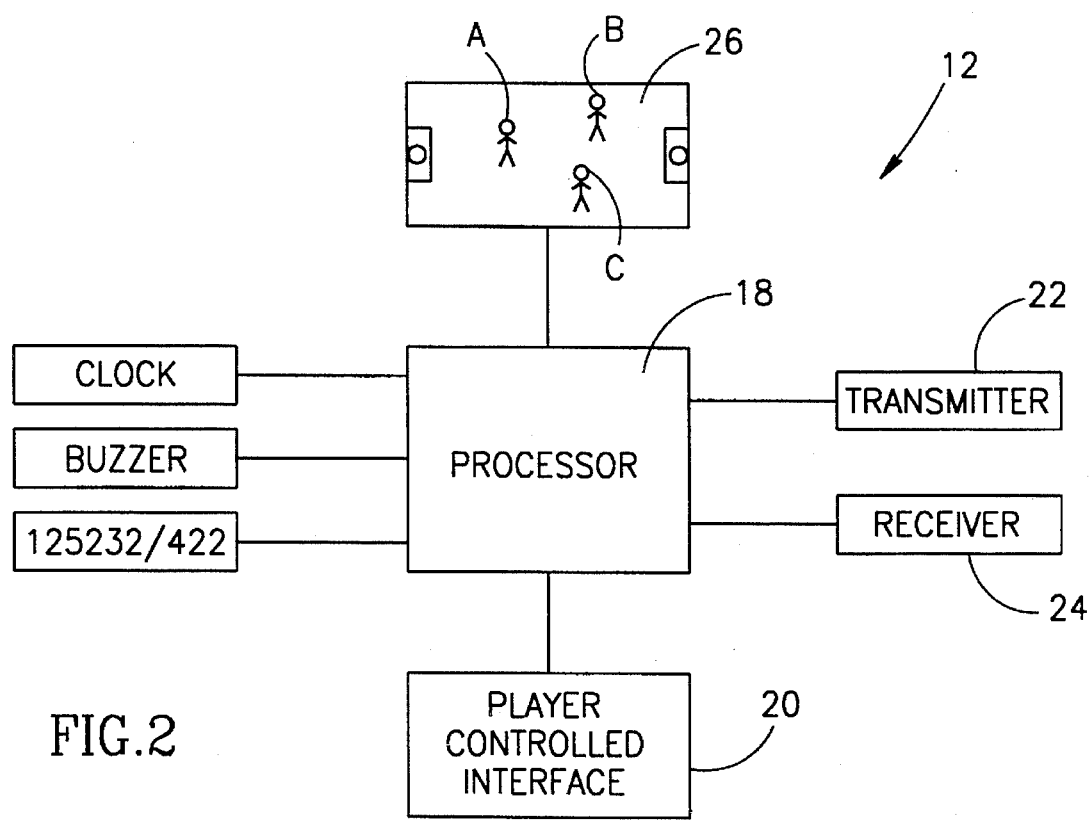
FIG. 2 shows a block diagram of one of the playing devices of the interactive multiple player game system of FIG. 1.

With reference now to FIG. 2, each playing device, in this case, playing device 12 includes the following units: First, a processor 18 for running a game scenario. Second, a player controlled interface 20 for enabling a player action within the game scenario. Third, a transmitter 22 for transmitting transmission packets to the other playing devices, in this, case, playing devices 14 and 16, participating in the network. Fourth, a receiver 24 for receiving transmission packets transmitted by other playing devices, in this case, playing devices 14 and 16, participating in the network. And lastly, a display 26 for displaying at least a portion of the game scenario.

Processor 18 includes software for running at least one game scenario suitable to be played on interactive multiple player game system 10. It should be readily understood that processor 18 of each playing device 12, 14 and 16 runs the same game scenario within a game session. Typical games include, but are not limited to, sport games, management simulation games, psychological group games/tests, and the like.

The "player action" as effected by player controlled interface 20 is determined by the type of game scenario being run by processor 18. Hence, a player action can be the manipulation of a playing piece in a sport game. Alternatively, a player action can be a business decision, for example, purchasing and selling stock, allocating resources to projects, and the like in a management simulation game.

Player controlled interface 20 is implemented to enable a player action suitable for the type of game scenario being run by processor 18. Hence, in the case of sports and the like, player controlled interface 20 includes either a joystick or buttons enabling movement of a playing piece within a game scenario. In the case of management simulation games, player controlled interface 20 can include a numeric keypad, selection buttons for selecting one option from a number of options and the like.

Furthermore, player controlled interface 20 preferably includes a JOIN button for either initiating an ad-hoc LAN or issuing a request to join an ad-hoc LAN in the process of being formed, a GAME selection button for issuing a vote as to which game should be played by players participating in a game session, a TEAM selection button for issuing a request as to which team a player would like to play on and a FIRE button for issuing a command to fire, kick a ball, and the like.

Display 26 displays at least a portion of the game scenario being rim by processor 18. The game scenario can be a playing area in the event that the game scenario is a sport, charts and figures in the event that the game scenario is a management simulation game, and the like. In all cases, a player can identify his "playing piece" in the team game scenario where his playing piece be a basketball player, a profit and loss account, and the like. Furthermore, a player can identify which playing pieces are assigned to the same team in a game scenario.

In the present case, display 26 displays three playing pieces denoted A, B and C corresponding to playing pieces of playing devices 12, 14 and 16, respectively. It should be noted that although playing pieces A, B and C all participate in a game scenario common to all three playing devices 12, 14 and 16, the display 26 of each of playing devices 12, 14 and 16 can display a different portion of the game scenario depending o the location or perspective of its playing piece within the game scenario.

For the sake of exposition, and without in any way limiting the scope of the present invention, a suitable game scenario is one in which each player is playing alone or against other players, for example, in a multi-player PacMan game in which each player tries to acquire as many points as possible by eating food while avoiding being eaten by a monster. The monster is moved by processor 18 of each playing device 12, 14 and 16 in the same fashion while each player moves his own playing piece about the maze using player controlled interface 20. Extra rules relating to the multi-player aspect of interactive multiple player game system 10 include enabling two or more players to kill the monster if the players are located within a pre-determined distance from the monster and the players press their FIRE buttons, enabling playing pieces to freely cross each other, and the like.

Alternatively, another suitable game scenario is one in which players play in teams, for example, in five-a-side basketball. The players participating in a game session can play against a team generated by interactive multiple player game system 10, a team automatically selected from the pool of available players by interactive multiple player game system 10, a team selected by the players themselves. In the instance that an odd number of players have selected to play a two team game scenario, interactive multiple player game system 10 can provide an additional player so as to balance the numbers of players in each team. Still again, in the event that there are not enough players to man two five-a-side teams, interactive multiple player game system 10 can provide additional players as required.

Figure 3:
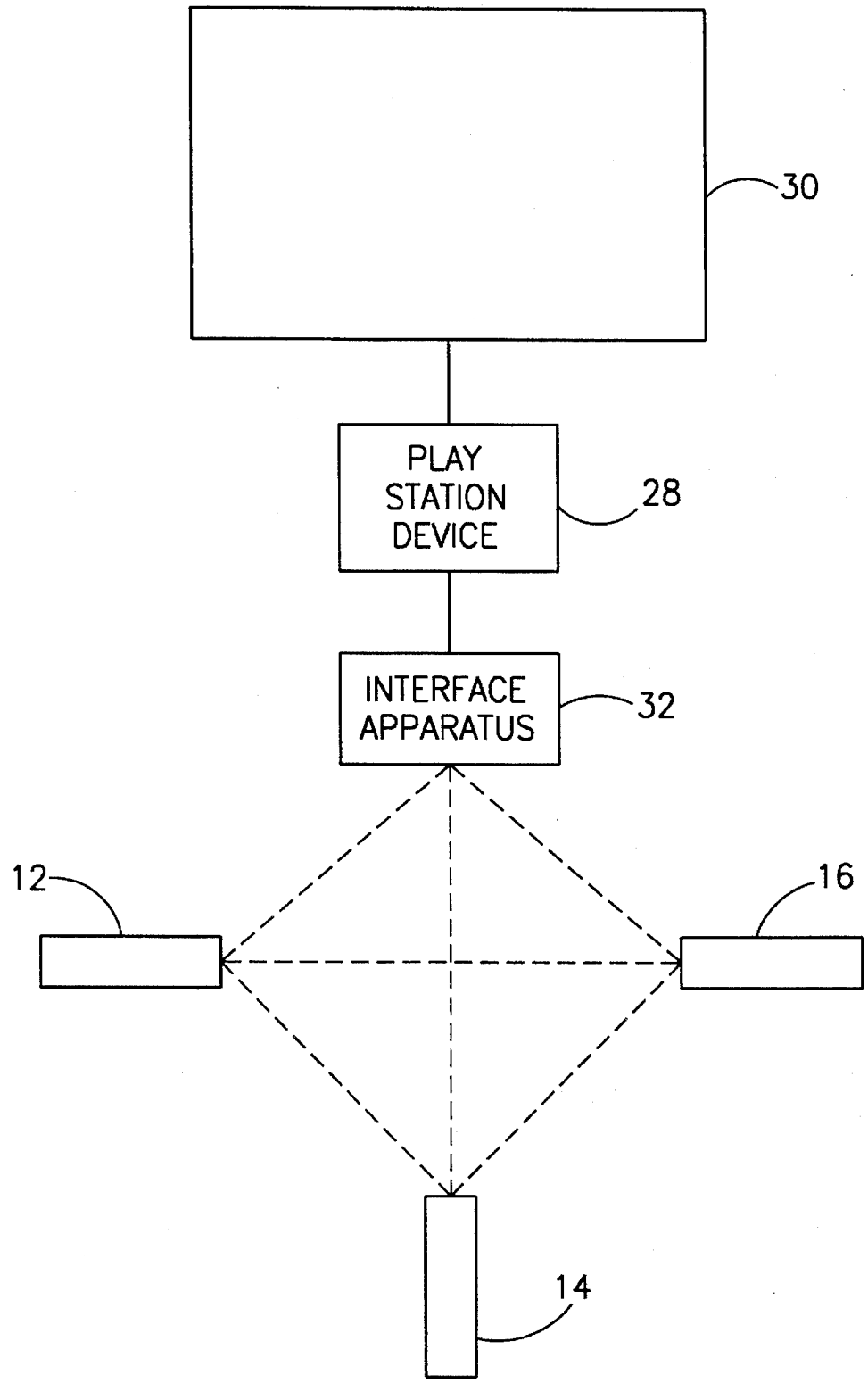
FIG. 3 shows a schematic view of an interactive multiple player game system including a play station device and at least one of the playing devices constructed and operative according to the teachings of the present invention.

With reference now to FIG. 3, interactive multiple player game system 10 can also include other devices participating in the network set up between playing devices 12, 14 and 16. Such devices can include a large display, TV interface, PC interface, and the like. In particular, interactive multiple player game system 10 can include a play station device 28, for example, as commercially available from Sega, enabling a game scenario to be displayed on a TV screen 30. In this case, system 10 requires an interface apparatus 32 for interfacing between play station device 28 and one or more of playing devices 12, 14 and 16. Interface apparatus 32 typically includes processor 18, transmitter 20 and receiver 24 as described hereinabove with reference to playing device 12. Preferably, play station device 28 can perform other functions, for example, as an umpire in a game scenario being played between playing devices 12, 14 and 16.

The preferred data transfer protocol of interactive multiple player game system 10 is now described with reference to FIG. 4. It should be noted that the following description is limited to the setting up of an ad-hoc LAN between playing devices 12, 14 and 16, commencing a game session, playing a game scenario, and terminating a game session. The following description does not include more advanced features of interactive multiple player game system 10 such as selecting a game to be played during a game session, assigning players to a team, and other features.

For the sake of example, the following parameters of the data transfer protocol of interactive multiple player game session 10 are employed: First, that the refresh rate of system 10 is 10 flames per second. In other words, interactive multiple player game system 10 has a "transmission cycle" of 0.10 second duration. Second, that the information transfer bit rate is 4,800 bits per second (bps) equivalent at 8 bits per byte to 600 bytes per second. In other words, 60 bytes of information can be transmitted during each transmission cycle of interactive multiple player game system 10. Each playing device 12, 14 and 16 transmits a three byte transmission packet described hereinbelow and there is preferably a one byte gap between transmission packets such that, in the case of interactive multiple player game system 10, a maximum number of 15 players can participate in a game session.

As described hereinabove, each playing device is required to receive full information regarding the actions taken by all the other playing devices before refreshing its display. To ensure that there is no cross talk between transmissions of different playing devices, the transmissions of the playing devices are preferably staggered along a transmission cycle at predetermined intervals. This is achieved by synchronizing the transmissions between the playing devices such that each playing device transmits at a pre-determined time during the transmission cycle. Hence, as shown in FIG. 4a, the data transfer protocol of interactive multiple player game system 10 preferably employs a 3-byte transmission packet in which the first byte is used as a synchronization byte (SYN), the second byte is used as a station number identifier byte (ID) and the third byte is used as a command byte (CMD).

Setting up the ad-hoc network of interactive multiple player game system 10 is as follows: A player presses the JOIN button on his playing device, say playing device 12, thereby initiating a transmission cycle of system 10. Playing device 12 listens during the period of the transmission cycle so as to determine whether any other playing device is currently transmitting a transmission packet. Assuming that no other playing devices are transmitting, playing device 12 determines that it is the first playing device of interactive multiple player game system 10.

Playing device 12 then transmits a transmission packet in the next transmission cycles in which the ID byte is assigned the value of 1 indicating that playing device 12 is the first playing device of system 10 and the CMD byte is assigned the value of 1 indicating that an ad-hoc LAN is in the process of being formed. Hence, as shown in FIG. 4b, playing device 12 transmits a SYN 1 1 transmission packet during each transmission cycle of system 10.

Playing device 12 continues to transmit the SYN 1 1 transmission packet during each transmission cycle period for a pre-determined time period, say, 15 seconds. If no other playing devices join the ad-hoc network which playing device 12 is attempting to establish, then playing device 12 displays a NO PLAY message on its display to the player.

Assuming a second player playing on his playing device, say playing device 14, wishes to play with the first player playing on playing device 12, he presses the JOIN button on playing device 14. Playing device 14 listens so as to determine whether any other playing device is transmitting. In this case, playing device 14 detects that playing device 12 has transmitted a SYN 1 1 transmission packet and therefore determines that it is the second playing device of interactive multiple player game system 10.

Thereafter, playing device 14 synchronizes its clock by the SYN byte of the SYN 1 1 transmission packet of playing device 12 and transmits its transmission packet in the next transmission cycles in which the ID byte is assigned the value of 2 indicating that playing device 14 is the second playing device of system 10 and the CMD byte is assigned the value of 1 indicating that an ad-hoc LAN is in the process of being formed. Hence, playing device 14 transmits a SYN 2 1 transmission packet. As can be readily seen in FIG. 4c, playing device 14 transmits its SYN 2 1 transmission packet after the 1 byte inter transmission packet gap left after the SYN 1 1 transmission packet transmitted by playing device 12.

The above process occurs for as many playing devices as wishing to participate in a playing session up to a maximum of 15 playing devices. For the set-up of interactive multiple player game system 10 shown, in FIG. 1, each transmission cycle of system 10 includes three transmission packets: SYN 1 1, SYN 2 1 and SYN 3 1.

After a pre-determined period of time, playing device 12 initiates a game session by changing the CMD byte to 0 from 1 so as to indicate to playing devices 14 and 16 that a game is about to start in the next transmission cycle of interactive multiple player game system 10. It should be noted that after establishment of the transmission sequence of playing devices 12, 14 and 16, each transmission packet may include just the CMD byte as will become apparent hereinbelow.

Thereafter, each playing device 12, 14 and 16 transmits a transmission packet in turn during the next transmission cycles of interactive multiple player game system 10 in which the CMD byte reflects the moves of their respective playing pieces A, B and C taken by each of the players. Assuming that codes of the CMD byte include instructions such as UP (2), DOWN (3), LEFT (4) and RIGHT (5), typical transmission packets from playing devices 12, 14 and 16 can be as shown in FIG. 4d, namely: SYN 1 2, SYN 2 2, SYN 3 3; SYN 1 2, SYN 2 3, SYN 3 3; SYN 1 5, SYN 2 3, SYN 3 1 and so on.

Processor 18 of each of playing devices 12, 14 and 16 terminates the game session according to a pre-determined set of rules according to the game scenario in question.

While the invention has been described with respect to a limited number of embodiments, it will be appreciated that many variations, modifications and other applications of the invention may be made.

What is claimed is:

1. An interactive multiple player game system comprising at least two playing devices communicating over an ad-hoc, wireless, all-to-all broadcast network, a playing device including:
   (a) a processor for running a game scenario common to all of said at least two playing devices;
   (b) a player controlled interface for enabling a player action within said game scenario;
   (c) a transmitter connected to said player controlled interface, said transmitter transmitting said player action over said network;
   (d) a receiver connected to said processor, said receiver receiving player actions from said at least one other playing device transmitting over said network;
   (e) a display for displaying at least a portion of said game scenario; and
   (f) a clock, said clock of a second playing device being synchronized with said clock of a first playing device.

2. The system as in claim 1 wherein said transmitter transmits said player action at a pre-determined interval within a transmission cycle of the system.

3. The system as in claim 1 wherein said display of each of said at least two playing devices displays a different portion of said game scenario.

4. The system as in claim 1 further comprising a play station device and an interface apparatus for interfacing between said play station device and said at least two playing devices.

5. An interactive multiple player game system comprising:
   (a) a play station device including an interface apparatus and a play station clock; and
   (b) at least one playing device communicating with said interface apparatus over an ad-hoc, wireless, all-to-all broadcast network, a playing device including:
      (i) a processor for running a game scenario common to said at least one playing device and said play station device;
      (ii) a player controlled interface for enabling a player action within said game scenario;
      (iii) a transmitter connected to said player controlled interface, said transmitter transmitting said player action over said network;
      (iv) a receiver connected to said processor, said receiver receiving instructions from at least said play station device transmitting over said network;
      (v) a display for displaying at least a portion of said game scenario; and
      (vi) a playing device clock, said play station clock being synchronized with said playing device clock.

6. (Amended) The system as in claim 5 wherein said transmitter transmits said player action at a pre-determined interval within a transmission cycle of the system.

7. The system as in claim 5 wherein said display of said at least one playing device displays a portion of said game scenario associated with said playing device.

8. A method for playing an interactive multiple player game between at least two players, comprising the steps of:
   (a) establishing an ad-hoc, wireless, all-to-all broadcast network between at least two playing devices;
   (b) providing a game scenario common to all of the at least two playing devices;
   (c) enabling a player action by each player within the game scenario;
   (d) transmitting player actions over the network;
   (e) receiving player actions transmitted over the network;
   (f) displaying at least a portion of the game scenario; and
   (g) synchronizing a clock of a second playing device to a clock of a first playing device.

9. The method as in claim 8 wherein a playing device transmits the player action at a pre-determined interval within a transmission cycle of the system.

10. The method as in claim 8 wherein the display of each of the at least two playing devices displays a different portion of the game scenario.

* * * * *